(12) United States Patent
Dreiling et al.

(10) Patent No.: US 12,349,234 B2
(45) Date of Patent: *Jul. 1, 2025

(54) SYSTEMS AND METHODS FOR PROVISIONING USER EQUIPMENT WITH AN ESIM PROFILE

(71) Applicant: T-Mobile Innovations LLC, Overland Park, KS (US)

(72) Inventors: Ryan P. Dreiling, Shawnee, KS (US); Aaron Reiser, Shawnee, KS (US); Philip Warren Uehling, Olathe, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/395,248

(22) Filed: Dec. 22, 2023

(65) Prior Publication Data
US 2024/0129714 A1 Apr. 18, 2024

Related U.S. Application Data

(63) Continuation of application No. 17/510,087, filed on Oct. 25, 2021, now Pat. No. 11,910,481.

(51) Int. Cl.
*H04W 8/20* (2009.01)
*H04W 8/26* (2009.01)
*H04W 60/04* (2009.01)

(52) U.S. Cl.
CPC ........... *H04W 8/205* (2013.01); *H04W 8/265* (2013.01); *H04W 60/04* (2013.01)

(58) Field of Classification Search
CPC ...... H04W 8/205; H04W 8/265; H04W 60/04
(Continued)

(56) References Cited

U.S. PATENT DOCUMENTS

| 10,708,766 B1 | 7/2020 | Umamaheswaran et al. |
| 10,764,746 B1 | 9/2020 | Dreiling et al. |

(Continued)

FOREIGN PATENT DOCUMENTS

| EP | 3337205 A1 | 6/2018 |
| EP | 4424040 A0 | 9/2024 |
| WO | 2023075902 A1 | 5/2024 |

OTHER PUBLICATIONS

Dreiling, Ryan P. "Systems and Methods for Provisioning User Equipment with an eSIM Profile," filed Aug. 22, 2022, International Application No. PCT/US2022/041088.

(Continued)

*Primary Examiner* — Nghi H Ly

(57) ABSTRACT

A method for provisioning a communication device with an embedded subscriber identity module (eSIM) profile. The method includes releasing a first eSIM profile by an eSIM management server hosting a plurality of unallocated eSIM profiles, and registering the release of the first eSIM profile by a discovery server. The method additionally includes requesting at least some of the information related to the release of the first eSIM profile from the discovery server, wherein the request includes an international mobile equipment identity (IMEI) of the communication device, and retrieving an address of the eSIM management server by the discovery server based on the IMEI. The method further includes providing the address to a local provisioning assistant (LPA) of the communication device by the discovery server, and provisioning the communication device with the first eSIM profile from the eSIM management server by the LPA of the communication device.

20 Claims, 8 Drawing Sheets

(58) Field of Classification Search
USPC .................. 455/558, 410, 411, 418, 424, 425
See application file for complete search history.

(56) References Cited

U.S. PATENT DOCUMENTS

| | | |
|---|---|---|
| 11,057,827 B1 | 7/2021 | Dreiling et al. |
| 11,910,481 B2 * | 2/2024 | Dreiling ............... H04W 8/265 |
| 2021/0306830 A1 | 9/2021 | Williams et al. |
| 2023/0125133 A1 | 4/2023 | Dreiling et al. |

OTHER PUBLICATIONS

Foreign Communication From a Related Counterpart Application, International Search Report and Written Opinion dated Nov. 30, 2022, International Application No. PCT/US2022/041088.

* cited by examiner

SYSTEMS AND METHODS FOR PROVISIONING USER EQUIPMENT WITH AN ESIM PROFILE

CROSS-REFERENCE TO RELATED APPLICATIONS

This application is a continuation of and claims priority under 35 U.S.C. § 120 to U.S. patent application Ser. No. 17/510,087 filed on Oct. 25, 2021, entitled "Systems and Methods for Provisioning User Equipment with an eSIM Profile" by Ryan P. Dreiling, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Many modern communication devices and/or other user equipment (UE) rely on subscriber identity modules (SIMs) to enable the communication device to communicate on a wireless network. A communication device's SIM may include, for example, a phone number, identification numbers unique to the communication device, network access credentials, encryption keys used in authentication when accessing a radio access network (RAN) by the communication device, proprietary data (e.g., power-on/off animation videos, logos, wallpapers, themes, etc.), and/or executable applications. SIMs may be embodied in various forms including, for example, physical SIM cards which may be inserted/removed from a communication device, and embedded SIMS (eSIMs) comprising a semiconductor chip of the communication device which is not removeable therefrom.

SUMMARY

In an embodiment, a method for provisioning a communication device with an eSIM profile is disclosed. The method includes releasing a first eSIM profile by an eSIM management server hosting a plurality of unallocated eSIM profiles, and registering the release of the first eSIM profile by a discovery server such that the discovery server correlates information related to the release of the first eSIM profile with an international mobile equipment identity (IMEI) of the communication device. The method additionally includes requesting at least some of the information related to the release of the first eSIM profile from the discovery server, wherein the request includes the IMEI of the communication device, and retrieving an address of the eSIM management server by the discovery server based on the IMEI. The method further includes providing the address to a local provisioning assistant (LPA) of the communication device by the discovery server in response to identifying the IMEI associated with the communication device, and provisioning the communication device with the first eSIM profile from the eSIM management server by the LPA of the communication device.

In an additional embodiment, another method for provisioning a communication device with an eSIM profile is disclosed. The method includes releasing a first eSIM profile by an eSIM management server hosting a plurality of unallocated eSIM profiles, and requesting information related to the release of the first eSIM profile by the communication device from a discovery server, wherein the request comprises a first IMEI of a plurality of separate IMEIs of the communication device. Additionally, the method includes retrieving an address of the eSIM management server by the discovery server based on the first IMEI, and providing the address to a LPA of the communication device by the discovery server in response to identifying the first IMEI associated with the communication device. Further, the method includes provisioning the communication device with the first eSIM profile from the eSIM management server by the LPA of the communication device.

In a further embodiment, another method for provisioning a communication device with an eSIM profile is disclosed. The method includes storing an IMEI of the communication device in an inventory database associated with a communication service provider, and releasing a first eSIM profile by an eSIM management server hosting a plurality of unallocated eSIM profiles. Additionally, the method includes registering the release of the first eSIM profile by a discovery server such that the discovery server correlates information related to the release of the first eSIM profile with the IMEI of the communication device stored in the inventory database, and requesting at least some of the information related to the release of the first eSIM profile from the discovery server, wherein the request comprises the IMEI of the communication device. Further, the method includes providing the at least some of the information to a LPA of the communication device by the discovery server in response to identifying the IMEI associated with the communication device, and provisioning the communication device with the first eSIM profile from the eSIM management server by the LPA of the communication device to allow the communication device to access a network associated with the communication service provider.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
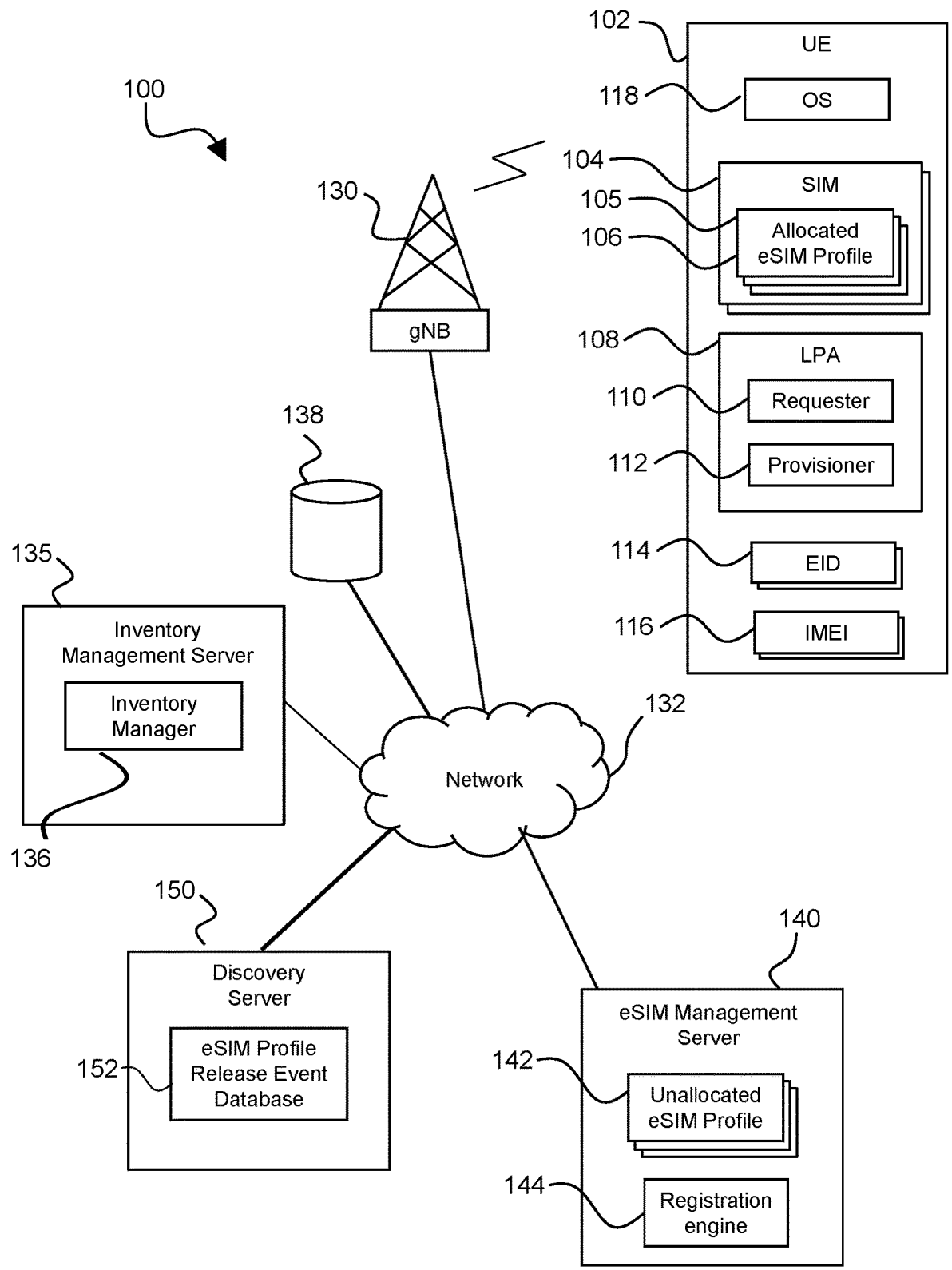
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As described above, many communication devices and other UE rely on SIMs to enable the communication device to communicate on a wireless network and which may be embodied in a removeable SIM card or an eSIM (also sometimes referred to as an embedded universal integrated circuit card (eUICC)) permanently coupled to the communication device. While some earlier eSIMs contained unalterable information hardcoded into the eSIM, eSIMs may also be reprogrammable. The information saved onto a reprogrammable eSIM of a communication device comprises an eSIM profile which includes the phone number, identification numbers, network access credentials, encryption keys, proprietary data, and/or executable applications that a similarly configured removeable SIM card would include. The eSIM profile may be remotely managed by a communication service provider, eliminating the need and logistical challenges associated with physical SIM cards. In this manner, the original manufacturer of the communication device need not pre-kit the communication device with a SIM card. Instead, only after the communication device has been sold to an end-user will an eSIM profile, customized to the communication service provider selected by the end-customer, be deployed to the communication device.

Communication devices and other UE may be identified by identifiers other than those associated with or contained in a given eSIM profile. For example, a communication device may be associated with a 15-character international mobile equipment identity (IMEI) unique to the particular communication device. Additionally, a communication device may be associated with a lengthier, 32-character embedded identity document (EID). The EID may also sometimes be referred to as the eUICC identifier associated with a SIM (e.g., an eSIM or eUICC) of the communication device. The IMEI and/or EID may be factory-installed and pre-programmed into a memory device of the communication device upon assembly of the communication device.

A communication device comprising a reprogrammable eSIM may be initially provisioned with at least one eSIM profile following the purchase of a subscription to a communication network associated with the eSIM profile by a user of the communication device. For example, an end-user may purchase a subscription account to access a communication network associated with a communication service provider for a communication device or other UE of the end-user's. The communication service provider may release one or more eSIM profiles for download onto the end-user's communication device in response to the purchase of the subscription account. Additionally, the communication service provider may register the release of the one or more eSIM profiles as one or more associated eSIM profile release events which are indexed on a discovery server. The discovery server may be in communication with a plurality of communication networks operated by a plurality of different communication service providers and which may act as an industry-wide clearing house for deploying eSIM profiles to communication devices. The eSIM profile release event registered by the discovery server may link the communication device with an eSIM subscription management sever associated with the communication service provider selected by an end-user of the communication device. The eSIM management server may sometimes be referred to as a subscription manager data preparation (SMDP+) server. The eSIM management server may host one or more eSIM profiles associated with the communication device and which have been released for download following the end-user's purchase of the subscription account.

During activation of the communication device, a local provisioning assistant (LPA) of the communication device may reach out to the discovery server and request one or more eSIM profile release events registered with the discovery server and associated with one or more eSIM profiles for the communication device to receive. The request provided to the discovery server may include an identifier associated with the communication device. The discovery server may then return the one or more eSIM profile release events which identify the eSIM management server associated with the end-user's communication service provider. Once the communication device has received the one or more eSIM profile release events identifying the eSIM management server, the communication device may reach out to the eSIM management server to obtain the one or more eSIM profiles identified by the one or more eSIM profile release events which may then be downloaded onto the eSIM of the communication device.

The one or more eSIM profile release events linked with the communication device and registered with the discovery server may each comprise an identifier uniquely identifying the communication device. Conventionally, the identifier of the one or more eSIM profile release events linking the one or more events with a particular communication device comprises the EID of the communication device. The eSIM profile release events registered with the discovery server are thus conventionally indexed by the EIDs of the communication devices linked to the eSIM profile release events.

In at least some applications, providing the communication service provider access to the lengthy, 32-character EIDs of the communication devices to be activated for access to a communication network associated with the provider may be a cumbersome and error-prone process. For example, when a communication service provider receives a shipment of a plurality of units of a particular communication device (the number of units potentially being in the tens of thousands for a given shipment), the original manufacturer of the communication device must include the EIDs of shipped units to the communication service provider as part of the logistics of the shipping process. Additionally, the communication service provider may be required to store and relate the EIDs of the shipped units to an inventory database curated by the communication service provider. As another example, the EID of a communication device or other UE procured by a third party such as, for example, a mobile virtual network operator (MVNO) or by the end-user themselves in a bring your own device (BYOD) arrangement may be difficult to obtain by the communication service provider.

In an embodiment, systems and methods for provisioning communication devices and/or other UE with eSIM profiles is provided. Particularly, rather than indexing the eSIM profile release events registered with the discovery server using the EIDs of the communication devices, the eSIM profile release events may instead be indexed by the IMEIs of the communication devices such that the communication devices are linked by their respective IMEIs on the discovery server rather than or in addition to their respective EIDs. The discovery server may correlate the eSIM profile release event for an IMEI to a matching identifier or event identity and an address for an eSIM management sever associated with the released eSIM profile and configured by the communication service provider. When activating a communication device, the LPA of the communication device may provide the IMEI of the communication device to the discovery server when requesting the one or more eSIM profile release events associated with the communication device, thereby allowing the discovery server to correlate the request to the one or more eSIM profile release events registered with the discovery server. The discovery server may, in response to receiving the request from the LPA of the communication device, return to the communication device's LPA one or more matching event identifiers and the address of the eSIM management server associated with the one or more released eSIM profiles. Having received the one or more matching event identifiers and the address of the eSIM management server, the LPA of the communication device may download the one or more matching eSIM profiles from the eSIM management server and install the one or more matching eSIM profiles onto the communication device, thereby allowing the communication device to access the communication network associated with the communication service provider.

Indexing the eSIM profile release events on the discovery server by IMEI rather than or in addition to EID may provide several advantages over indexing by EID and not IMEI. For example, in the interest of convenience, the end-user may activate his or her communication device through a web browser or similar interface in which the end-user manually enters the identifier of the communication device into the browser so that a request may be made to the discovery server including the identifier provided by the end-user. In such a scenario, it is substantially more convenient and less error-prone for the end-user to manually enter the 15-character IMEI, which is conveniently broken down into multiple, discrete blocks of characters, in lieu of the lengthier 32-character EID. Additionally, IMEI is the international standard identifier for uniquely identifying communication devices, and thus users of communication devices may be more familiar with the identifier and the ways in which the IMEI may be located (e.g., through a settings menu of the communication device, printed onto an exterior of the communication device, etc.). Further, the IMEI is conveniently presented on an exterior of the communication device in a series of separate and discrete blocks of characters such that the IMEI is easier to locate for the end-user than the 32-character EID.

In addition to increasing the ease at which the identifier of a communication device may be accurately obtained during the activation of the communication device, indexing the eSIM profile release events on the discovery server by IMEI may also eliminate the necessity of storing and relating the EIDs of communication devices in an inventory database by the communication service provider upon receiving the communication devices from the original manufacturer thereof. Given that the communication devices may be activated using their IMEIs, if it is desired later on to access the EIDs of the communication devices the EIDs may be accessed by the communication service provider and/or other party through the communication network associated with the communication service provider via an application programming interface (API) and/or other network interface.

The embodiments described herein are a specific technical solution to a specific technical problem. The technical problem includes, for example, (1) the difficulty in accurately obtaining an EID uniquely identifying a communication device or other UE when activating the communication device such that the communication device may access a communication network associated with a communication service provider, and (2) the added logistical challenges presented by storing and relating EIDs of communication devices in an inventory database of the communication service provider prior to activation of the communication devices. Embodiments disclosed herein address these challenges by registering the release of an eSIM profile on a discovery server such that information related to the release of the eSIM profile, such as an address of an eSIM management database from which the eSIM profile may be obtained by a communication device, is correlated with an IMEI of the communication device. In this manner, the communication device may obtain the released eSIM profile by requesting at least some of the information related to the release of the eSIM profile from the discovery server, the request including the IMEI of the communication device.

Additionally, some communication devices include multiple SIMs each bound to a particular and corresponding EID. For example, a communication device may include a first EID linked specifically and only to a first SIM of the communication device, and a second EID linked specifically and only to a second SIM of the communication device. Based on the particular capabilities and/or functionalities provided by the first SIM and the second SIM, a user of the communication device may wish to elect which of the first SIM and the second SIM a given eSIM profile is linked. Moreover, when indexing the information related to the release of an eSIM profile by EID, the communication device may not provide the user with the ability to elect which of the first EID and the second EID is linked to the given eSIM profile, with instead the first EID being linked in a first-come-first-served manner.

Conversely, when indexing the release of an eSIM profile by IMEI, the user may not be limited to a first-come-first-serve arrangement and instead may have the freedom to elect which of the first IMEI and second IMEI is linked to a the given eSIM profile as desired by the user. In other words, the user may elect the particular SIM to be linked to the given eSIM profile. Thus, the indexing of the information related to the release of the eSIM profile by IMEI may also offer further advantages with respect to communication devices with multiple IMEIs as the user of communication and/or the communication service provider may have the freedom to elect which of the multiple IMEIs is linked to a given eSIM profile released for use by the communication device.

Turning to FIG. 1, a communication system 100 is described. In an embodiment, the communication system 100 generally includes an electronic device (user equipment—UE) 102, an access node 130, a communication network 132, an inventory management server 135, an inventory database 138, an eSIM management server 140, and a discovery server 150. The UE 102 may comprise a communication device such as, for example, a tablet computer, a smartphone, an internet of things (IoT) device, and/or a wearable computer. UE 102 may be operated by a user or customer of the network 132 such as an enterprise, organization, or individual user.

The access node 130 of communication system 100 may provide communication coupling UE 102 to the network 132 according to a 5G protocol, for example 5G, 5G New Radio, or 5G LTE radio communication protocols. The access node 130 may provide communication coupling UE 102 to the network 132 according to a long term evolution (LTE), a code division multiple access (CDMA), and/or a global system for mobile communication (GSM) radio communication protocol. The access node 130 may be referred to for some contexts as a gigabit Node B (gNB), an enhanced Node B (eNB), a cell site, or a cell tower. Additionally, while not shown, at least some of UE 102 may be communicatively coupled to the network 132 via a WiFi access point or another non-cellular radio device. Further, while a single access node 130 is illustrated in FIG. 1, it is understood that communication system 100 may comprise any number of access nodes 130.

The network 132 of communication system 100 may comprise one or more public networks, one or more private networks, or a combination thereof. For example, network 132 may comprise a 5G core network. Further details of 5G networks are discussed below with reference to FIGS. 6A, 6B. Additionally, while shown as communicatively coupled to the network 132, servers 135, 150 may be considered part of network 132 and are illustrated as separate from network 132 in FIG. 1 to promote discussing its roles with respect to UE 102, as will be discussed further herein.

UE 102 may include one or more SIMs 104, a LPA 108, an EID 114, and an IMEI 116. LPA 108 of UE 102 is executable on an operating system (OS) 118 of UE 102. The one or more SIMs 104 of UE 102 may each comprise an integrated circuit or microchip configured to couple to a motherboard or other printed circuit board (PCB) of the UE 102. For example, at least one of the SIMs of UE 102 may comprise an eSIM, eUICC or integrated SIM (iSIM) in the form of an integrated circuit or microchip embedded permanently into the UE 102. Additionally, at least one of the SIMs of UE 102 may comprise a SIM card removeably coupled to the UE 102 and which may be physically replaced as desired by the user of UE 102.

Each of the one or more SIMs 104 may load or execute one or more corresponding allocated eSIM profiles 106 following activation of the UE 102 to allow the UE 102 to allow UE 102 to access the network 132 using the one or more allocated eSIM profiles 106. The allocated eSIM profile 106 of a given SIM 104 may include, for example, a phone number, identification numbers unique to the communication device, network access credentials, encryption keys used in authentication when accessing a radio access network (RAN) by the communication device, proprietary data (e.g., power-on/off animation videos, logos, wallpapers, themes, etc.), and/or executable applications.

In some embodiments, UE 102 may only comprise a single SIM 104 upon which a single matching allocated eSIM profile 106 may be loaded following the activation of UE 102. However, in other embodiments, UE 102 may comprise a plurality of SIMs 104 upon which a single matching allocated eSIM profile 106 may be loaded following the activation of UE 102. For example, UE 102 may comprise a Dual SIM Dual Standby (DSDS) communication device comprising a pair of separate SIMs 104 each having a separate matching allocated eSIM profile 106. In an example, UE 102 may comprise a first SIM 104 in the form of an eSIM permanently embedded within the UE 102, and a second SIM 104 in the form of a physical SIM card removeably inserted into a slot formed in the UE 102. In this configuration, a first allocated eSIM profile 106 may be loadable onto a first SIM 104 of UE 102 while a second allocated eSIM profile 106 may be loadable onto a second SIM 104 of UE 102. In still other embodiments, one or more SIMs 104 of UE 102 may load and execute a plurality of separate eSIM profiles 104. In some embodiments, a SIM 104 of UE 102 may comprise a plurality of logical (e.g., defined in software) slots or receptacles 105 each configured to receive a single corresponding allocated eSIM profile 106. In this manner, each allocated eSIM profile 106 may be linked to a given slot 105 of a plurality of slots 105 of a single SIM 104.

In embodiments in which a plurality of allocated eSIM profiles 106 are executable by UE 102, the information contained in the first allocated eSIM profile 106 may vary from that contained in the second allocated eSIM profile 106. For instance, the phone number contained in the first allocated eSIM profile 106 may be different from the phone number contained in the second allocated eSIM profile 106 and so on and so forth. Additionally, different eSIM profiles 106 may support different quality of service (QoS) parameters, different security policies, different subscription accounts with the same or different communication service providers (e.g., personal business subscriptions with the same communication service provider). The user of UE 102 may thus selectably use either the first allocated eSIM profile 106 or the second allocated eSIM profile 106 of the UE 102 to access the network 132 as desired. As an example, the first allocated eSIM profile 106 may provide access to features of network 132 that are desired by the user of UE 102 at one time while the second allocated eSIM profile 106 may provide access to other, different features of network 132 that are desired by the user of UE 102 at another time.

The EID 114 of UE 102 is a 32-character identifier unique to the UE 102 and which may be assigned to the UE 102 by an original manufacturer of the UE 102. The EID 114 particularly identifies and is associated with the SIM 104 of the UE 102. Thus, a single UE 102 comprising a plurality of SIMs 104 (e.g., a DSDS communication device) comprises a corresponding plurality of EIDs 114, where each EID 114 is specifically bound or linked to one of the SIMs 104 of the UE 102. In other words, a UE 102 comprising a first SIM 104 and a second SIM 104 also comprises a first EID 114 linked specifically and only to the first SIM 104 and a second EID 114 linked specifically and only to the second SIM 104. The EID 114 and one or more IMEIs 116 of UE 102 may be pre-loaded onto a memory device of UE 102 by the original manufacturer of UE 102.

The IMEI 116 of UE 102 is a unique, 15-character identifier unique to the 102 and which may be assigned to the UE 102 by an original manufacturer of the UE 102. The EID 114 and/or the one or more IMEIs 116 of UE 102 may be printed onto an external surface of UE 102 to allow a user of UE 102 to discover the EID 114 and/or one or more IMEIs 116 when desired.

In some embodiments, a single IMEI 116 may be associated with and unique to the UE 102. However, in other embodiments, a plurality of IMEIs 116 may be associated with and unique to a given UE 102. In embodiments where UE 102 comprises a plurality of SIMs 104, UE 102 may comprise a plurality of IMEIs 116 which are separately linked to the plurality of SIMs 104 (e.g., a first IMEI 116 is linked to a first SIM 104, a second IMEI 116 is linked to a second SIM 104, etc.). In embodiments where UE 102 comprises a SIM 104 including a plurality of allocated eSIM profiles 106, the UE 102 may comprise a plurality of IMEIs 116 with at least some of the plurality of IMEIs 116 being separately linked to the plurality of allocated eSIM profiles 106 of the SIM 104. For example, a first IMEI 116 may be linked to a first logical slot 105 of the SIM 104 while a second IMEI 116 may be linked to a second logical slot 105 of the same SIM 104. The linking of IMEIs 116 to SIMs 104 and/or logical slots 105 may be defined by the original manufacturer of the UE 102. As will be discussed further herein, the linkage of specific IMEIs 116 to specific SIMs 104 and/or logical slots 105 may allow allocated eSIM profiles 106 to be selectably loaded onto desired SIMs 104 and/or logical slots 105.

In this exemplary embodiment, the LPA 108 of UE 102 comprises a requester 110 and a provisioner 112. Requester 110 is configured to request one or more eSIM profile release events registered with the discovery server 150 by the eSIM management server 140 during the activation of UE 102. Particularly, during activation of UE 102, requester 110 of LPA 108 may transmit a request to discovery server 150 (via communication network 132 and/or another communication network communicatively coupled to the discovery server 150 and the UE 102) including one of the one or more IMEIs of UE 102 and requesting an eSIM profile release event associated with an eSIM profile to be loaded onto the UE 102 during activation thereof.

In some embodiments, a component of a first UE 102 (e.g., a requester 110, an application such as a web browser operated by a user of the first UE 102, etc.) may request an eSIM profile release event associated with a second UE 102, the requested eSIM profile release event corresponding to an eSIM profile to be loaded onto the second UE 102. Thus, the eSIM profile loaded onto the second UE 102 in this example need not be originally requested by the requester 110 of the second UE 102 and instead may be requested by another UE which may be configured differently than UE 102.

The provisioner 112 of the LPA 108 of UE 102 is configured to download one or more eSIM profiles associated with one or more eSIM profile release events requested by the requester 110 from the eSIM management server 140, and to load the eSIM profiles onto the appropriate eSIM(s) 104 and/or logic slot(s) 105 of the UE 102 as allocated eSIM profiles 106 to thereby allow UE 102 to access network 132 via the one or more allocated eSIM profiles 106. In some embodiments, the information may be downloaded by provisioner 112 from the eSIM management server 140 using cellular or Wi-Fi internet access. In some embodiments, the IMEI 116, being linked to a particular eSIM 104 or logic slot 105, included in the request for the eSIM profile release event may define the appropriate eSIM 104 or logic slot 105 to which the eSIM profile is to be loaded by the provisioner 112 as an allocated eSIM profile 106.

The loading of an eSIM profile onto an eSIM 104 of UE 102 by provisioner 112 may comprise installing information onto hardware embodying the eSIM 104 and/or onto other hardware of UE 102 such as a memory device thereof. For example, the loading of an eSIM profile onto an eSIM 104 of UE 102 by provisioner 112 may comprise installing or loading a phone number, instructions, one or more access keys or tokens, identities, etc., onto hardware embodying the eSIM 104. The loading of an eSIM profile onto an eSIM 104 of UE 102 by provisioner 112 may additionally comprise installing proprietary data and executable applications onto hardware embodying the eSIM 104 and/or other hardware of UE 102.

In this exemplary embodiment, the inventory management server 135 comprises an inventory manager 136 generally configured to manage an inventory database 138 associated with a communication service provider associated with network 132. Particularly, inventory manager 136 of inventory management server 135 may store information pertaining to UE (e.g., UE 102) in the inventory database 138 upon receipt of the UE from an original manufacturer of the UE and prior to being sold to customers of the communication service provider. For example, identifiers associated with the UE received or shipped from the manufacturer may be stored in the inventory database 138 by inventory manager 136 to assist with, for example, activating the UE once a user associated with the UE has acquired a subscription account with network 132.

The inventory manager 136 of inventory management server 135 may store in inventory database 138 the IMEI(s) (e.g., IMEI(s) 116 of UE 102) of the UE received by the communication service provider. In some embodiments, the IMEIs stored in inventory database 138 may be correlated by inventory manager 136 with other identifiers also associated with the UE received by the communication service provider. For example, in addition to IMEIs, the inventory database 138 may store EIDs of UE (e.g., EID 114 of UE 102) received by the communication service provider. The EIDs stored in the inventory database 138 may be correlated with or indexed by the IMEIs of the UE (e.g., the EID of a first UE is indexed by the IMEI of the first UE and so on and so forth).

In this exemplary embodiment, the eSIM management server 140 of communication system 100 comprises a plurality of unallocated eSIM profiles 142 and a registration engine 144. The plurality of unallocated eSIM profiles 142 comprise eSIM profiles which have yet to be loaded onto a UE 102 and thus may be reserved for future use by users wishing to activate a UE 102 in order to access the communication network 132 associated with a communication service provider also associated with the plurality of unallocated eSIM profiles 142. As with allocated eSIM profiles 106 described above, each unallocated eSIM profile 142 may comprise a phone number, identification numbers unique to the communication device, network access credentials, encryption keys used in authentication when accessing a radio access network (RAN) by the communication device, proprietary data (e.g., power-on/off animation videos, logos, wallpapers, themes, etc.), and/or executable applications. In some embodiments, unallocated eSIM profiles 142 may be stored in a separate eSIM profile database communicatively connected to eSIM management server 140 through the network 132.

The unallocated eSIM profiles 142 may initially be in an unreserved or locked state in which they cannot be accessed by UE such as UE 102. The registration engine 144 of eSIM management server 140 may however release an unallocated eSIM profile 142 from the locked state and reserve the unallocated eSIM profile 142 for a particular UE (e.g., UE 102) to initiate an activation of the UE. For example, in response to a user of UE 102 obtaining a subscription to the network 132, the registration engine 144 may register the release of the unallocated eSIM profile 142 with the discovery server 150 by placing the unallocated eSIM profile 142 into an unlocked or accessible state on the eSIM management server 140 (reserving the unallocated eSIM profile 142 for the UE 102) and providing information to the discovery server 150 to allow the provisioner 112 of the UE 102 to acquire the now reserved eSIM profile 142. In some embodiments, the obtainment of the subscription to network 132 may be initiated on the eSIM management server 140 or another server of network 132 and the identity of an IMEI 116 of UE 102 may be provided by a user of UE 102 (e.g., manually into a web browser, etc.) or automatically by the UE 102.

In some embodiments, the registration engine 144 may provide the discovery server 150 with the IMEI 116 of the particular UE 102 to which the eSIM profile 142 has been reserved, the address of the eSIM management server 140 (e.g., fully qualified domain name or (FQDN), uniform resource locator (URL), etc.), an identifier of the reserved eSIM profile 142 such as an integrated circuit card identifier (ICCI), and optionally a matching identity associated with the reserved eSIM profile 142 and generated by the registration engine 144 or by another component of eSIM management server 140. In certain embodiments, the registration engine 144 may also provide the EID 114 of the UE 102 to which the eSIM profile 142 has been reserved if known by the registration engine 144. For example, the EID 114 of the UE 102 may be linked to the IMEI 116 of UE 102 in an inventor database stored on the network 132 and to which the registration engine 144 may access.

In this exemplary embodiment, the discovery server 150 of communication system 100 is communicatively coupled with network 132 and comprises an eSIM profile release event database 152. Discovery server 150 may comprise a generic server not particularly associated with the network 132 and/or the communication service provider associated with network 132. Instead, discovery server 150 may comprise a generic clearing house communicatively coupled to a plurality of different networks associated with a plurality of different communication service providers.

Figure 2:
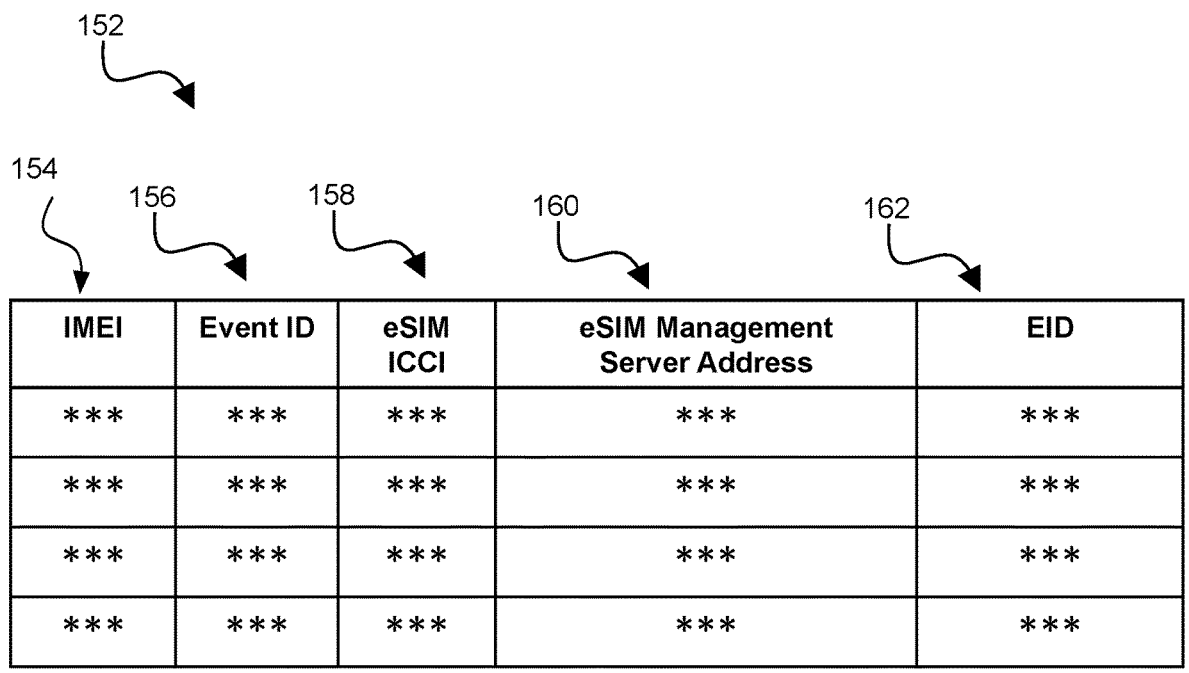
FIG. 2 is an illustration of an eSIM profile release event database according to an embodiment of the disclosure.

Turning to FIGS. 1, 2, an exemplary eSIM profile release event database 152 is partially shown in FIG. 2. The eSIM profile release event database 152 includes a plurality of IMEIs 154 associated with different UE (e.g., UE 102) to which at least one allocated eSIM profile 142 has been reserved by eSIM management server 140. The IMEIs 154 stored in eSIM profile release event database 152 may comprise a lookup term which discovery server 150 is configured to lookup or search in response to receiving a request by a requester (e.g., requester 110 of UE 102) regarding an eSIM profile release event registered with discovery server 150.

In this exemplary embodiment, eSIM profile release event database 152 may additionally include a plurality of release event identities (Event IDs) 156 correlated by the eSIM profile release event database 152 with the plurality of IMEIs 154 stored therein. Each release event identity 156 may be generated by eSIM management server 140 to identify a given release event (e.g., the release of a given unallocated eSIM profile 142) initiated by eSIM management server 140. eSIM profile release event database 152 may also include a plurality of eSIM ICCIs 158 also correlated with the plurality of IMEIs 154 stored in eSIM profile release event database 152. Each eSIM ICCI may identify and be unique with respect to a given unallocated eSIM profile 142 which has been released by the eSIM management server 140.

eSIM profile release event database 152 additionally includes an eSIM management server address 160 correlated with each IMEI 154. For instance, the eSIM management server address 160 correlated with each IMEI 154 may be an address, such as, for example, a FQDN of the eSIM management server 140. In instances where the unallocated eSIM profiles 142 are hosted by a plurality of separate eSIM management servers 140, the given eSIM management server address 160 may comprise the address of the particular eSIM management server which hosts the unallocated eSIM profile 142 associated with the particular IMEI 154. eSIM profile release event database 152 may further include a plurality of EIDs 162 uniquely identifying a corresponding plurality of UEs and each correlated to a corresponding IMEI 154. For instance, eSIM profile release event database 152 may comprise EIDs 162 in embodiments in which EIDs 162 are tracked by a communication service provider associated with network 132 and eSIM management server 140.

In some embodiments, the registration module 144 of eSIM management server 140 may provide the IMEIs 154, release event identities 156, eSIM ICCIs, eSIM management server address(es) 160, and/or EIDs 162 to the discovery server 150. In other embodiments, discovery server 150 may receive one or more of the IMEIs 154, release event identities 156, eSIM ICCIs, eSIM management server address(es) 160, and EIDs 162 from a computing device other than eSIM management server 140. For instance, discovery server 150 may receive one or more of the IMEIs 154, release event identities 156, eSIM ICCIs 158, eSIM management server address(es) 160, and EIDs 162 from a registration module of another server of network 132. In still other embodiments, discovery server 150 may receive one or more of the IMEIs 154, release event identities 156, eSIM ICCIs 158, eSIM management server address(es) 160, and EIDs 162 from a UE (e.g., UE 102).

As described above, each of the release event identities 156, eSIM ICCIs 158, eSIM management server address(es) 160, and EIDs 162 may be correlated such that a release event identity 156, eSIM ICCI 158, eSIM management server address 160, and/or EID 162 may be looked up by discovery server 150 using the IMEI 154 as a lookup term. In some embodiments, the EIDs 162 may comprise a secondary or backup lookup term should the IMEI 154 of a request received by the discovery server 150 (the request including both an IMEI 154 and an EID 162) not be locatable or included in eSIM profile release event database 152. In other words, discovery server 150 may first search by the IMEI 154 of the request by a UE (e.g., UE 102) and then, if the IMEI 154 may not be located in the eSIM profile release event database 152 by discovery server 150, search for the EID 162 if also included in the request by the UE.

Figure 3:
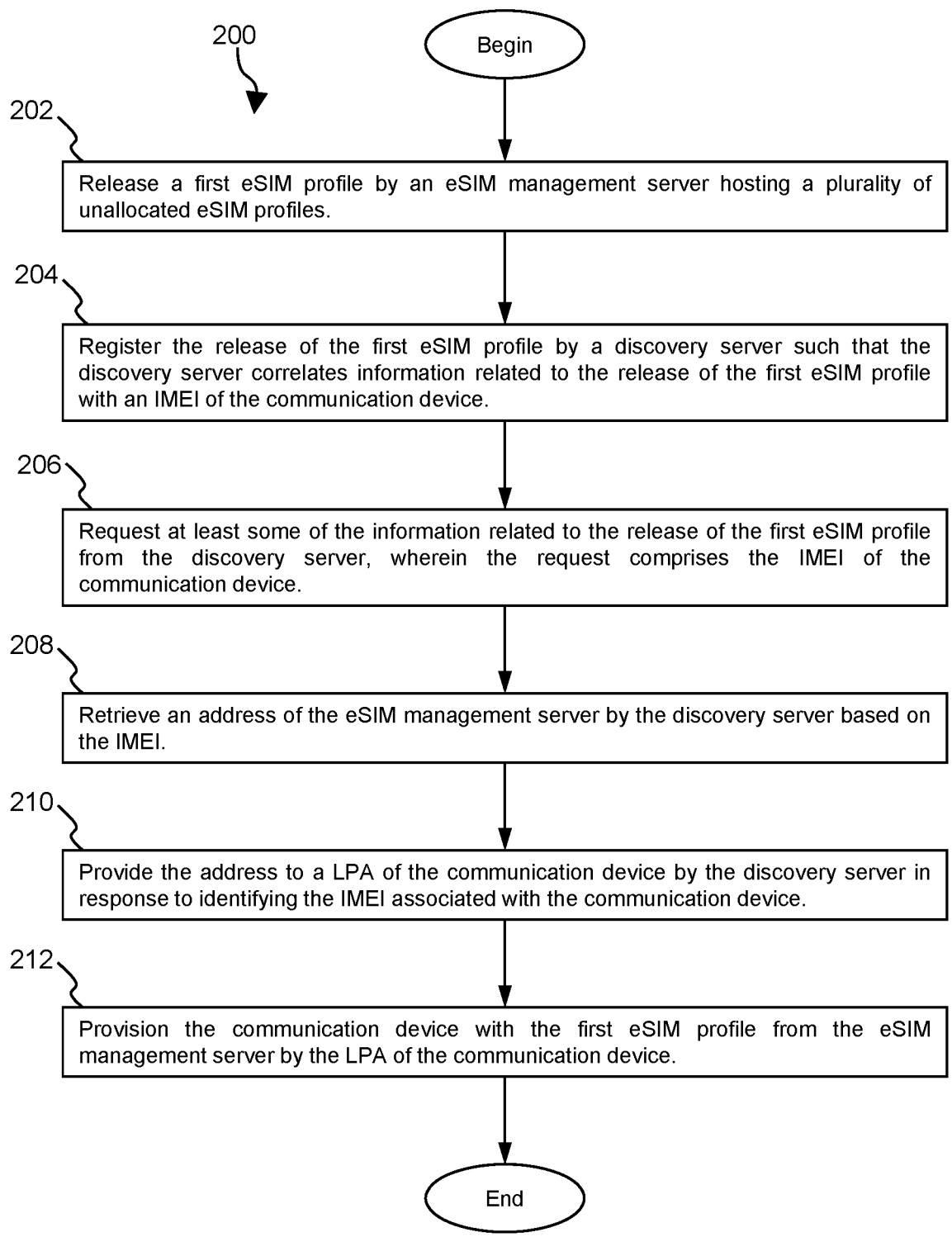
FIG. 3 is a flow chart of a method according to an embodiment of the disclosure.

Turning to FIG. 3, a method 200 is described. In an embodiment, the method 200 is a method for provisioning a communication device with an eSIM profile. At block 202, the method 200 comprises releasing a first eSIM profile by an eSIM management server (e.g., eSIM management server 140 illustrated in FIG. 1) hosting a plurality of unallocated eSIM profiles (e.g., unallocated eSIM profiles 142 illustrated in FIG. 1). At block 204, method 200 comprises registering the release of the first eSIM profile by a discovery server (e.g., discovery server 150) such that the discovery server correlates information related to the release of the first eSIM profile with an IMEI of the communication device (e.g., IMEI 116 of UE 102 illustrated in FIG. 1).

At block 206, method 200 comprises requesting at least some of the information related to the release of the first eSIM profile from the discovery server, wherein the request comprises the IMEI of the communication device. In some embodiments, the at least some of the information requested at block 206 may comprise an eSIM management server address of an eSIM management server from which an eSIM profile correlated with the IMEI of the communication device may be obtained. In certain embodiments, the at least some of the information requested at block 206 may comprise a registration event identity (e.g., registration event identity 156 illustrated in FIG. 2), and/or an eSIM ICCI (e.g., eSIM ICCI 158 illustrated in FIG. 2) associated or linked to the eSIM profile correlated with the IMEI of the communication device.

At block 208, method 200 comprises retrieving an address of the eSIM management server by the discovery server based on the IMEI. At block 210, method 200 comprises providing the address to a LPA (e.g., LPA 108 of UE 102 illustrated in FIG. 1) of the communication device by the discovery server in response to identifying the IMEI associated with the communication device. At block 212, method 200 comprises provisioning the communication device with the first eSIM profile from the eSIM management server by the LPA of the communication device.

Figure 4:
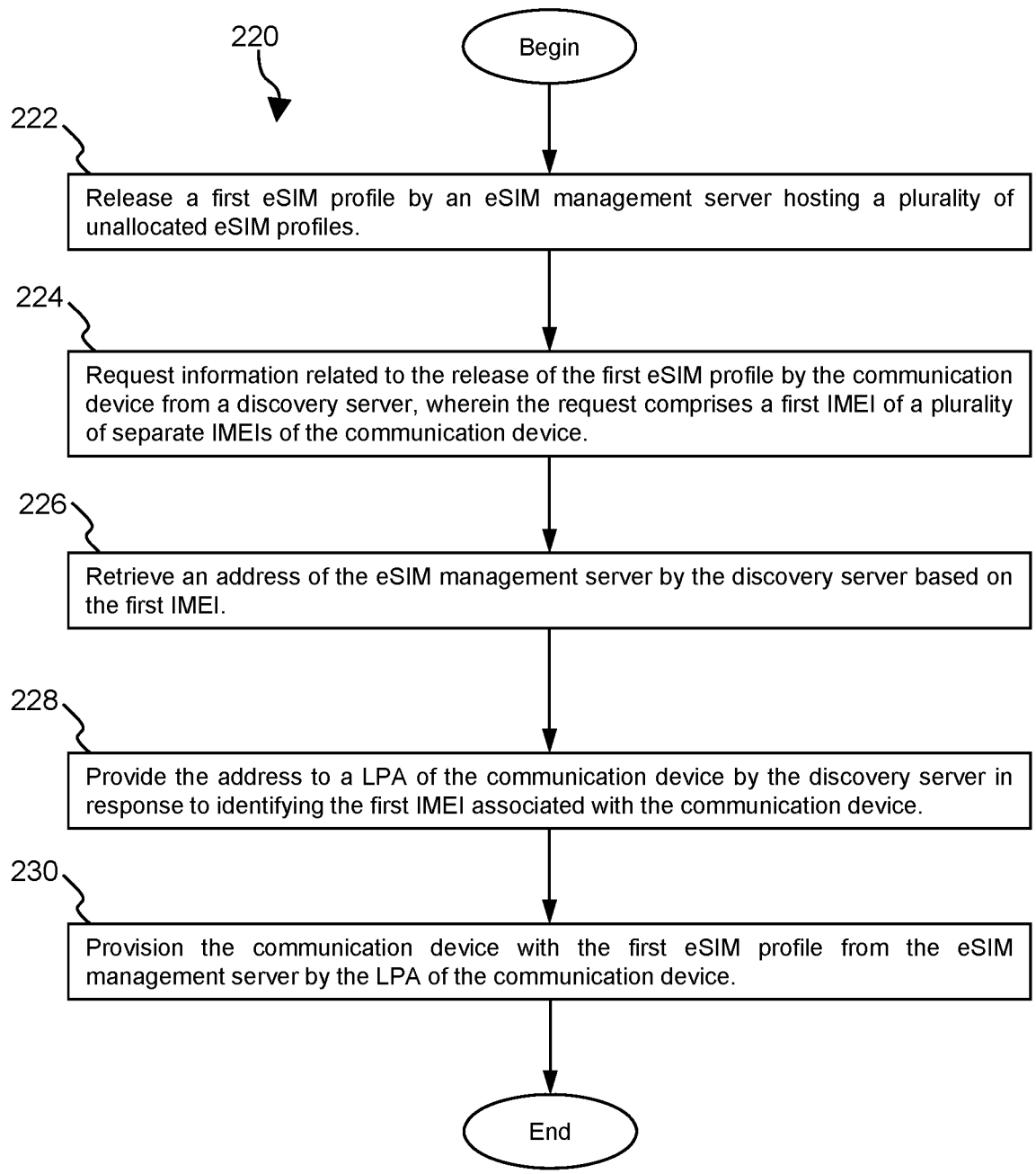
FIG. 4 is a flow chart of another method according to an embodiment of the disclosure.

Turning to FIG. 4, a method 220 is described. In an embodiment, the method 220 is a method for provisioning a communication device (e.g., UE 102 illustrated in FIG. 1) with an eSIM profile. At block 222, the method 220 comprises releasing a first eSIM profile by an eSIM management server (e.g., eSIM management server 140 illustrated in FIG. 1) hosting a plurality of unallocated eSIM profiles (e.g., unallocated eSIM profiles 142 illustrated in FIG. 1). At block 224, method 220 comprises requesting information related to the release of the first eSIM profile by the communication device from a discovery server (e.g., discovery server 150 illustrated in FIG. 1), wherein the request comprises a first IMEI of a plurality of separate IMEIs of the communication device (e.g., a first IMEI 116 of UE 102 illustrated in FIG. 1). In some embodiments, the at least some of the information requested at block 224 may comprise an eSIM management server address of an eSIM management server from which an eSIM profile correlated with the IMEI of the communication device may be obtained. In certain embodiments, the at least some of the information requested at block 224 may comprise a registration event identity (e.g., registration event identity 156 illustrated in FIG. 2), and/or an eSIM ICCI (e.g., eSIM ICCI 158 illustrated in FIG. 2) associated or linked to the eSIM profile correlated with the IMEI of the communication device.

At block 226, method 220 comprises retrieving an address of the eSIM management server by the discovery server based on the first IMEI. At block 228, method 220 comprises providing the address to a LPA (e.g., LPA 108 of UE 102 illustrated in FIG. 1) of the communication device by the discovery server in response to identifying the first IMEI associated with the communication device. At block 230, method 220 comprises provisioning the communication device with the first eSIM profile from the eSIM management server by the LPA of the communication device.

Figure 5:
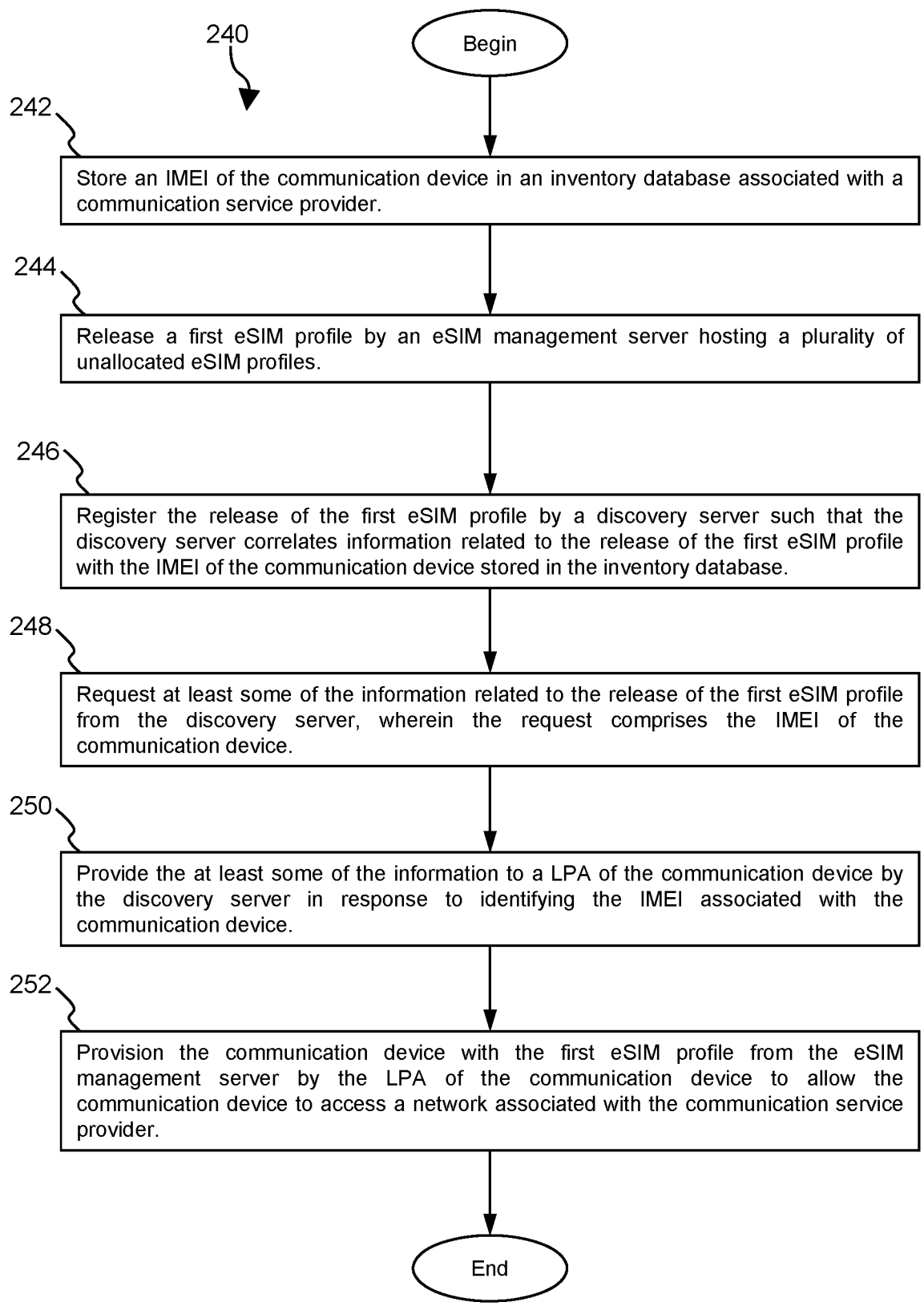
FIG. 5 is a flow chart of another method according to an embodiment of the disclosure.

Turning to FIG. 5, a method 250 is described. In an embodiment, the method 250 is a method for provisioning a communication device (e.g., UE 102 illustrated in FIG. 1) with an eSIM profile. At block 242, the method 240 comprises storing an IMEI of the communication device (e.g., IMEI 116 of the UE 102 illustrated in FIG. 1) in an inventory database (e.g., inventory database 138 illustrated in FIG. 1) associated with a communication service provider. At block 244, method 240 comprises releasing a first eSIM profile by an eSIM management server (e.g., eSIM management server 140 illustrated in FIG. 1) hosting a plurality of unallocated eSIM profiles (e.g., unallocated eSIM profiles 142 illustrated in FIG. 1).

At block 246, method 240 comprises registering the release of the first eSIM profile by a discovery server (e.g., discovery server 150 illustrated in FIG. 1) such that the discovery server correlates information related to the release of the first eSIM profile with the IMEI of the communication device stored in the inventory database. At block 248, method 240 comprises requesting at least some of the information related to the release of the first eSIM profile from the discovery server, wherein the request comprises the IMEI of the communication device. In some embodiments, the at least some of the information requested at block 248 may comprise an eSIM management server address of an eSIM management server from which an eSIM profile correlated with the IMEI of the communication device may be obtained. In certain embodiments, the at least some of the information requested at block 248 may comprise a registration event identity (e.g., registration event identity 156 illustrated in FIG. 2), and/or an eSIM ICCI (e.g., eSIM ICCI 158 illustrated in FIG. 2) associated or linked to the eSIM profile correlated with the IMEI of the communication device.

At block 250, method 240 comprises providing the at least some of the information to a LPA of the communication device (e.g., LPA 108 of UE 102 illustrated in FIG. 1) by the discovery server in response to identifying the IMEI associated with the communication device. At block 252, method 240 comprises provisioning the communication device with the first eSIM profile from the eSIM management server by the LPA of the communication device to allow the communication device to access a network associated with the communication service provider.

Figure 6A:
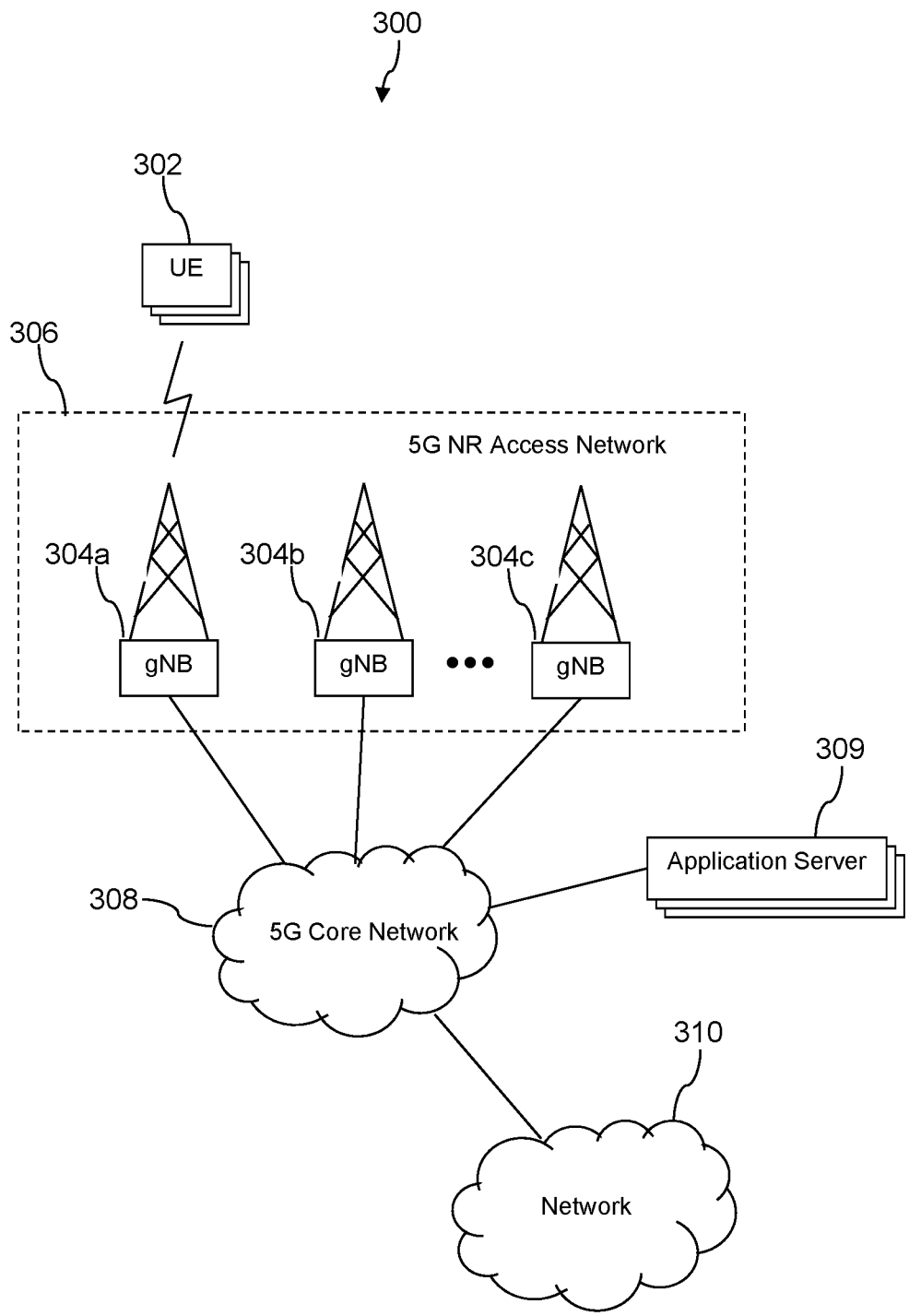
FIG. 6A is a block diagram of another communication system according to an embodiment of the disclosure.

Turning now to FIG. 6A, an exemplary communication system 300 is described. At least some of the components of communication system 100 (e.g., one or more of UEs 102, access node 130, network 132, etc.) shown in FIG. 1 may be implemented in accordance and in a matter consistent with the teachings of communication system 300 shown in FIG. 6A. Typically the communication system 300 includes a number of access nodes 304 that are configured to provide coverage in which UEs 302 such as cell phones, tablet computers, machine-type-communication devices, tracking devices, embedded wireless modules, and/or other wirelessly equipped communication devices (whether or not user operated), can operate. In some embodiments, access node 130 of the communication system 100 shown in FIG. 1 may be configured similarly as access nodes 304 of communication system 300. Additionally, in some embodiments, one or more of UEs 102 of the communication system 100 shown in FIG. 1 may be configured similarly as UEs 302. The access nodes 304 may be said to establish an access network 306. The access network 306 may be referred to as a radio access network (RAN) in some contexts. In a 5G technology generation an access node 304 may be referred to as a gigabit Node B (gNB). In 4G technology (e.g., long term evolution (LTE) technology) an access node 304 may be referred to as an enhanced Node B (eNB). In 3G technology (e.g., code division multiple access (CDMA) and global system for mobile communication (GSM)) an access node 304 may be referred to as a base transceiver station (BTS) combined with a basic station controller (BSC). In some contexts, the access node 304 may be referred to as a cell site or a cell tower. In some implementations, a picocell may provide some of the functionality of an access node 304, albeit with a constrained coverage area. Each of these different embodiments of an access node 304 may be considered to provide roughly similar functions in the different technology generations.

In an embodiment, the access network 306 comprises a first access node 304a, a second access node 304b, and a third access node 304c. It is understood that the access network 306 may include any number of access nodes 304. Further, each access node 304 could be coupled with a core network 308 that provides connectivity with various application servers 309 and/or a network 310. In some embodiments, network 132 of the communication system 100 shown in FIG. 1 may be configured similarly as core network 308. In an embodiment, at least some of the application servers 309 may be located close to the network edge (e.g., geographically close to the UE 302 and the end user) to deliver so-called "edge computing." The network 310 may be one or more private networks, one or more public networks, or a combination thereof. The network 310 may comprise the public switched telephone network (PSTN). The network 310 may comprise the Internet. With this arrangement, a UE 302 within coverage of the access network 306 could engage in air-interface communication with an access node 304 and could thereby communicate via the access node 304 with various application servers and other entities.

The communication system 300 could operate in accordance with a particular radio access technology (RAT), with communications from an access node 304 to UEs 302 defining a downlink or forward link and communications from the UEs 302 to the access node 304 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 304 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 304 could define an air interface configured in a specific manner to define physical resources for carrying information wirelessly between the access node 304 and UEs 302.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and sub-carrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 302.

In addition, certain resource elements on the example air interface could be reserved for special purposes. For instance, on the downlink, certain resource elements could be reserved to carry synchronization signals that UEs 302 could detect as an indication of the presence of coverage and to establish frame timing, other resource elements could be reserved to carry a reference signal that UEs 302 could measure in order to determine coverage strength, and still other resource elements could be reserved to carry other control signaling such as PRB-scheduling directives and acknowledgement messaging from the access node 304 to served UEs 302. And on the uplink, certain resource elements could be reserved to carry random access signaling from UEs 302 to the access node 304, and other resource elements could be reserved to carry other control signaling such as PRB-scheduling requests and acknowledgement signaling from UEs 302 to the access node 304.

The access node 304, in some instances, may be split functionally into a radio unit (RU), a distributed unit (DU), and a central unit (CU) where each of the RU, DU, and CU have distinctive roles to play in the access network 306. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
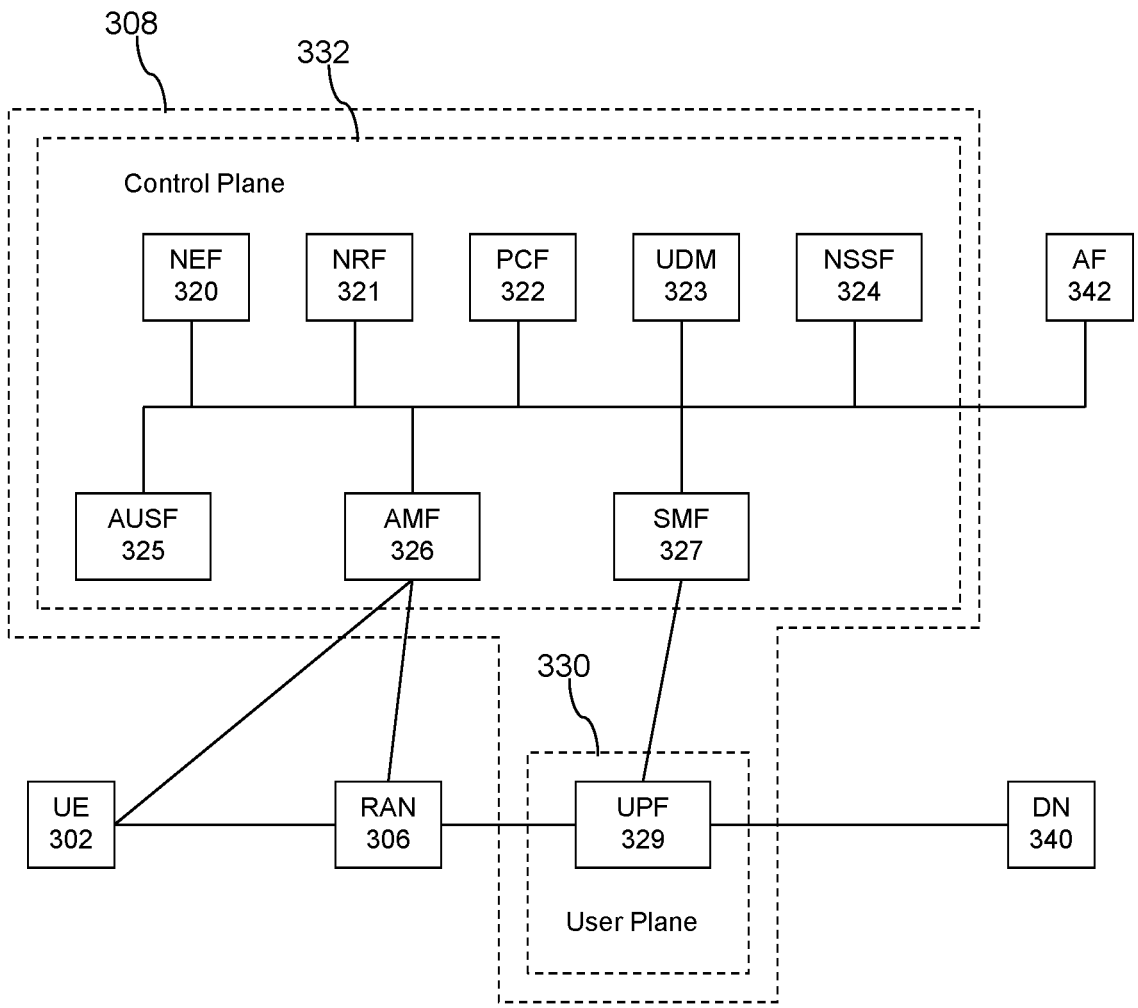
FIG. 6B is a block diagram of a core network of the communication system of FIG. 6A according to an embodiment of the disclosure.

Turning now to FIG. 6B, further details of the core network 308 are described. In an embodiment, the core network 308 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 329, an authentication server function (AUSF) 325, an access and mobility management function (AMF) 326, a session management function (SMF) 327, a network exposure function (NEF) 320, a network repository function (NRF) 321, a policy control function (PCF) 322, a unified data management (UDM) 323, a network slice selection function (NSSF) 324, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 308 may be segregated into a user plane 330 and a control plane 332, thereby promoting independent scalability, evolution, and flexible deployment.

The UPF 329 delivers packet processing and links the UE 302, via the access node 306, to a data network 340 (e.g., the network 310 illustrated in FIG. 6A). The AMF 326 handles registration and connection management of non-access stratum (NAS) signaling with the UE 302. Said in other words, the AMF 326 manages UE registration and mobility issues. The AMF 326 manages reachability of the UEs 302 as well as various security issues. The SMF 327 handles session management issues. Specifically, the SMF 327 creates, updates, and removes (destroys) protocol data unit (PDU) sessions and manages the session context within the UPF 329. The SMF 327 decouples other control plane functions from user plane functions by performing dynamic host configuration protocol (DHCP) functions and IP address management functions. The AUSF 325 facilitates security processes.

The NEF 320 securely exposes the services and capabilities provided by network functions. The NRF 321 supports service registration by network functions and discovery of network functions by other network functions. The PCF 322 supports policy control decisions and flow based charging control. The UDM 323 manages network user data and can be paired with a user data repository (UDR) that stores user data such as customer profile information, customer authentication number, and encryption keys for the information. An application function 342, which may be located outside of the core network 308, exposes the application layer for interacting with the core network 308. In an embodiment, the application function 342 may be execute on an application server 309 located geographically proximate to the UE 302 in an "edge computing" deployment mode. The core network 308 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 324 can help the AMF 326 to select the network slice instance (NSI) for use with the UE 302.

Figure 7:
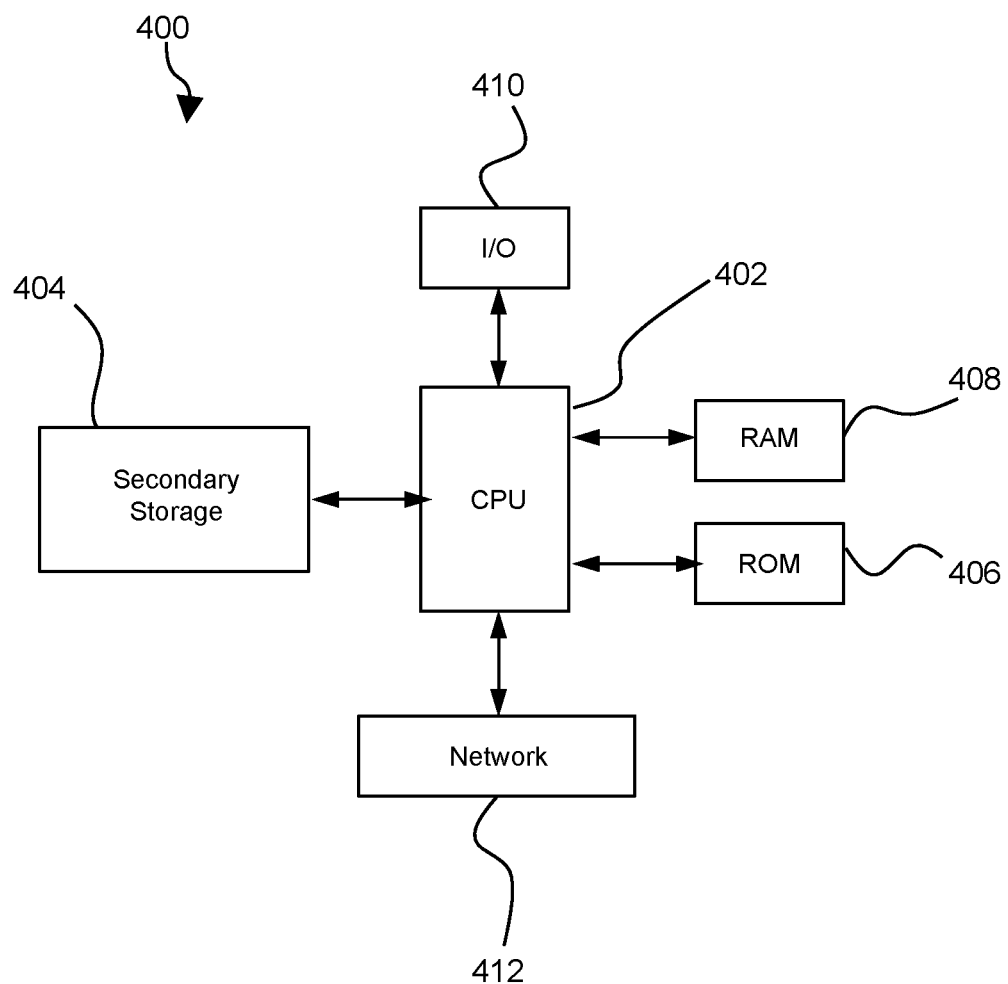
FIG. 7 is a block diagram of a computer system according to an embodiment of the disclosure.

FIG. 7 illustrates a computer system 400 suitable for implementing one or more embodiments disclosed herein. The computer system 400 includes a processor 402 (which may be referred to as a central processor unit or CPU) that is in communication with memory devices including secondary storage 404, read only memory (ROM) 406, random access memory (RAM) 408, input/output (I/O) devices 410, and network connectivity devices 412. The processor 402 may be implemented as one or more CPU chips.

It is understood that by programming and/or loading executable instructions onto the computer system 400, at least one of the CPU 402, the RAM 408, and the ROM 406 are changed, transforming the computer system 400 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 400 is turned on or booted, the CPU 402 may execute a computer program or application. For example, the CPU 402 may execute software or firmware stored in the ROM 406 or stored in the RAM 408. In some cases, on boot and/or when the application is initiated, the CPU 402 may copy the application or portions of the application from the secondary storage 404 to the RAM 408 or to memory space within the CPU 402 itself, and the CPU 402 may then execute instructions that the application is comprised of. In some cases, the CPU 402 may copy the application or portions of the application from memory accessed via the network connectivity devices 412 or via the I/O devices 410 to the RAM 408 or to memory space within the CPU 402, and the CPU 402 may then execute instructions that the application is comprised of. During execution, an application may load instructions into the CPU 402, for example load some of the instructions of the application into a cache of the CPU 402. In some contexts, an application that is executed may be said to configure the CPU 402 to do something, e.g., to configure the CPU 402 to perform the function or functions promoted by the subject application. When the CPU 402 is configured in this way by the application, the CPU 402 becomes a specific purpose computer or a specific purpose machine.

The secondary storage 404 is typically comprised of one or more disk drives or tape drives and is used for non-volatile storage of data and as an over-flow data storage device if RAM 408 is not large enough to hold all working data. Secondary storage 404 may be used to store programs which are loaded into RAM 408 when such programs are selected for execution. The ROM 406 is used to store instructions and perhaps data which are read during program execution. ROM 406 is a non-volatile memory device which typically has a small memory capacity relative to the larger memory capacity of secondary storage 404. The RAM 408 is used to store volatile data and perhaps to store instructions. Access to both ROM 406 and RAM 408 is typically faster than to secondary storage 404. The secondary storage 404, the RAM 408, and/or the ROM 406 may be referred to in some contexts as computer readable storage media and/or non-transitory computer readable media.

I/O devices 410 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 412 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 412 may provide wired communication links and/or wireless communication links (e.g., a first network connectivity device 412 may provide a wired communication link and a second network connectivity device 412 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 412 may enable the processor 402 to communicate with the Internet or one or more intranets. With such a network connection, it is contemplated that the processor 402 might receive information from the network, or might output information to the network in the course of performing the above-described method steps. Such information, which is often represented as a sequence of instructions to be executed using processor 402, may be received from and outputted to the network, for example, in the form of a computer data signal embodied in a carrier wave.

Such information, which may include data or instructions to be executed using processor 402 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 402 executes instructions, codes, computer programs, scripts which it accesses from hard disk, floppy disk, optical disk (these various disk based systems may all be considered secondary storage 404), flash drive, ROM 406, RAM 408, or the network connectivity devices 412. While only one processor 402 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 404, for example, hard drives, floppy disks, optical disks, and/or other device, the ROM 406, and/or the RAM 408 may be referred to in some contexts as non-transitory instructions and/or non-transitory information.

In an embodiment, the computer system 400 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 400 to provide the functionality of a number of servers that is not directly linked to the number of computers in the computer system 400. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 400, at least portions of the contents of the computer program product to the secondary storage 404, to the ROM 406, to the RAM 408, and/or to other non-volatile memory and volatile memory of the computer system 400. The processor 402 may process the executable instructions and/or data structures in part by directly accessing the computer program product, for example by reading from a CD-ROM disk inserted into a disk drive peripheral of the computer system 400. Alternatively, the processor 402 may process the executable instructions and/or data structures by remotely accessing the computer program product, for example by downloading the executable instructions and/or data structures from a remote server through the network connectivity devices 412. The computer program product may comprise instructions that promote the loading and/or copying of data, data structures, files, and/or executable instructions to the secondary storage 404, to the ROM 406, to the RAM 408, and/or to other non-volatile memory and volatile memory of the computer system 400.

In some contexts, the secondary storage 404, the ROM 406, and the RAM 408 may be referred to as a non-transitory computer readable medium or a computer readable storage media. A dynamic RAM embodiment of the RAM 408, likewise, may be referred to as a non-transitory computer readable medium in that while the dynamic RAM receives electrical power and is operated in accordance with its design, for example during a period of time during which the computer system 400 is turned on and operational, the dynamic RAM stores information that is written to it. Similarly, the processor 402 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for provisioning a communication device with an embedded subscriber identity module (eSIM) profile, the method comprising:
    registering release of a first eSIM profile by a discovery server such that the discovery server correlates information related to the release of the first eSIM profile with an international mobile equipment identity (IMEI) of the communication device, wherein the first eSIM profile is hosted and released by an eSIM management server;
    receiving a request for information related to the release of the first eSIM profile by the discovery server, wherein the request comprises the IMEI of the communication device;
    retrieving an address of the eSIM management server by the discovery server based on the IMEI; and
    providing the address to a local provisioning assistant (LPA) of the communication device by the discovery server in response to identifying the IMEI associated with the communication device, wherein the communication device is provisioned with the first eSIM profile from the eSIM management server.

2. The method of claim 1, wherein:
    the IMEI of the communication device comprises a first IMEI of a plurality of IMEIs of the communication device;
    the method further comprises:
        receiving a request for information related to release of a second eSIM profile by the discovery server, wherein the request comprises a second IMEI of the plurality of separate IMEIs of the communication device;
        retrieving an address of the eSIM management server by the discovery server based on the second IMEI; and
        providing the address to a local provisioning assistant (LPA) of the communication device by the discovery server in response to identifying the second IMEI associated with the communication device, wherein the communication device is provisioned with the second eSIM profile from the eSIM management server.

3. The method of claim 1, further comprising correlating the IMEI of the communication device by the discovery server with a registration event identity identifying the release of the first eSIM profile by the eSIM management server, and an eSIM integrated circuit card identifier (ICCI) uniquely identifying the first eSIM profile.

4. The method of claim 1, wherein provisioning the communication device with the first eSIM profile from the eSIM management server comprises at least one of loading a phone number, an identification number unique to the communication device, a network access credential, an encryption key, proprietary data, and executable applications onto an embedded SIM (eSIM) of the communication device.

5. The method of claim 1, wherein the IMEI included in the request for the information related to the release of the first eSIM profile is provided by a device separate from the communication device.

6. The method of claim 1, further comprising storing the IMEI of the communication device in an inventory database associated with a communication service provider, and wherein provisioning the communication device with the first eSIM profile from the eSIM management server allows the communication device to access a network associated with the communication service provider.

7. A system for provisioning a communication device with an embedded subscriber identity module (eSIM) profile, the system comprising:
    a discovery server configured to:
        register release of a first eSIM profile such that the discovery server correlates information related to the release of the first eSIM profile with an international mobile equipment identity (IMEI) of the communication device, wherein the first eSIM profile is hosted and released by an eSIM management server,
        receive a request for information related to the release of the first eSIM profile, wherein the request comprises the IMEI of the communication device,
        retrieve an address of the eSIM management server by the discovery server based on the IMEI, and
        provide the address to a local provisioning assistant (LPA) of the communication device in response to identifying the IMEI associated with the communication device, wherein the communication device is provisioned with the first eSIM profile from the eSIM management server.

8. The system of claim 7, wherein the IMEI of the communication device comprises a first IMEI of a plurality of IMEIs of the communication device, and wherein the discovery server is further configured to:
    receive a request for information related to release of a second eSIM profile, wherein the request comprises a second IMEI of the plurality of separate IMEIs of the communication device,
    retrieve an address of the eSIM management server based on the second IMEI, and
    provide the address to a local provisioning assistant (LPA) of the communication device in response to identifying the second IMEI associated with the communication device, wherein the communication device is provisioned with the second eSIM profile from the eSIM management server.

9. The system of claim 7, wherein the discovery server is further configured to correlate the IMEI of the communication device with a registration event identity identifying the release of the first eSIM profile by the eSIM management server, and an eSIM integrated circuit card identifier (ICCI) uniquely identifying the first eSIM profile.

10. The system of claim 9, wherein the discovery server is further configured to correlate the IMEI of the communication device with an embedded identity document (EID) of the communication device.

11. The system of claim 7, wherein provisioning the communication device with the first eSIM profile from the eSIM management server comprises at least one of loading a phone number, an identification number unique to the communication device, a network access credential, an encryption key, proprietary data, and executable applications onto an embedded SIM (eSIM) of the communication device.

12. The system of claim 7, wherein the IMEI included in the request for the information related to the release of the first eSIM profile is provided by a device separate from the communication device.

13. The system of claim 7, wherein the discovery server is further configured to store the IMEI of the communication device in an inventory database associated with a communication service provider.

14. A method for provisioning a communication device with an embedded subscriber identity module (eSIM) profile, the method comprising:
   receiving a request for information related to release of a first eSIM profile by a discovery server, wherein the request comprises a first international mobile equipment identity (IMEI) of a plurality of separate IMEIs of the communication device, and wherein the first eSIM profile is hosted and released by an eSIM management server;
   retrieving an address of the eSIM management server by the discovery server based on the first IMEI;
   providing the address to a local provisioning assistant (LPA) of the communication device by the discovery server in response to identifying the first IMEI associated with the communication device, wherein the communication device is provisioned with the first eSIM profile from the eSIM management server;
   receiving a request for information related to release of a second eSIM profile by the discovery server, wherein the request comprises a second IMEI of the plurality of separate IMEIs of the communication device, and wherein the second eSIM profile is hosted and released by the eSIM management server;
   retrieving an address of the eSIM management server by the discovery server based on the second IMEI;
   providing the address to the LPA of the communication device by the discovery server in response to identifying the second IMEI associated with the communication device, wherein the communication device is provisioned with the second eSIM profile from the eSIM management server, and wherein the first IMEI of the communication device is linked to a first SIM of the communication device and the second IMEI of the communication device linked to a second SIM of the communication device.

15. The method of claim 14, wherein the first IMEI included in the request for the information related to the release of the first eSIM profile is provided by a device separate from the communication device.

16. The method of claim 14, wherein the second IMEI included in the request for the information related to the release of the second eSIM profile is provided by a device separate from the communication device.

17. The method of claim 14, further comprising:
   registering the release of the first eSIM profile by the discovery server such that the discovery server correlates information related to the release of the first eSIM profile with the first IMEI of the communication device.

18. The method of claim 14, further comprising storing the first IMEI of the communication device in an inventory database associated with a communication service provider, and wherein provisioning the communication device with the first eSIM profile from the eSIM management server allows the communication device to access a network associated with the communication service provider.

19. The method of claim 14, further comprising:
   registering the release of the second eSIM profile by the discovery server such that the discovery server correlates information related to the release of the second eSIM profile with the second IMEI of the communication device.

20. The method of claim 14, further comprising storing the second IMEI of the communication device in an inventory database associated with a communication service provider, and wherein provisioning the communication device with the second eSIM profile from the eSIM management server allows the communication device to access a network associated with the communication service provider.

* * * * *